United States Patent
Masters et al.

(10) Patent No.: US 8,544,292 B2
(45) Date of Patent: Oct. 1, 2013

(54) VEHICLE AIR CONDITIONER

(75) Inventors: W. James Masters, Trophy Club, TX (US); Douglas W. Fugate, Flower Mound, TX (US); Edwin E. Wilson, Grand Prairie, TX (US); John T. Johnson, Arlington, TX (US); W. Jason Masters, Grapevine, TX (US)

(73) Assignee: OmniTherm, Inc., Fort Worth, TX (US)

( * ) Notice: Subject to any disclaimer, the term of this patent is extended or adjusted under 35 U.S.C. 154(b) by 976 days.

(21) Appl. No.: 11/775,652

(22) Filed: Jul. 10, 2007

(65) Prior Publication Data
US 2009/0014150 A1    Jan. 15, 2009

(51) Int. Cl.
*F25D 17/02*    (2006.01)
*B60H 1/32*    (2006.01)

(52) U.S. Cl.
USPC .................... 62/434; 62/435; 62/239; 62/244

(58) Field of Classification Search
USPC .................... 62/434, 435, 239, 244
See application file for complete search history.

(56) References Cited

U.S. PATENT DOCUMENTS

| | | | | |
|---|---|---|---|---|
| 4,210,001 A | * | 7/1980 | Miller, Sr. | 62/468 |
| 4,273,100 A | * | 6/1981 | Cogliano | 126/635 |
| 5,409,547 A | * | 4/1995 | Watanabe et al. | 136/204 |
| 5,975,192 A | * | 11/1999 | Moratalla et al. | 165/45 |
| 6,378,313 B2 | * | 4/2002 | Barrash | 62/6 |
| 2002/0014330 A1 | * | 2/2002 | Guyonvarch | 165/202 |
| 2003/0102729 A1 | * | 6/2003 | Sanuki | 310/58 |
| 2004/0237541 A1 | * | 12/2004 | Murphy | 62/3.61 |
| 2007/0034355 A1 | * | 2/2007 | Kuo | 165/80.4 |

FOREIGN PATENT DOCUMENTS
EP    1278022 A1  *  1/2003

OTHER PUBLICATIONS

"Basic Refrigeration Cycle—So, How Does Refrigeration Cycle Works?" Central Air Conditioner and Refrigeration Cycle for Beginners. Web. Feb. 14, 2011. <http://www.central-air-conditioner-and-refrigeration.com/basic-refrigeration-cycle.html>. Website.*

* cited by examiner

*Primary Examiner* — John Pettitt
*Assistant Examiner* — Ignacio E Landeros
(74) *Attorney, Agent, or Firm* — Daniel J. Chalker; Chalker Flores, LLP

(57) ABSTRACT

The present invention provides an air conditioner for a vehicle that includes a closed refrigeration loop. The closed refrigeration loop includes a compressor, a refrigerant-to-coolant heat exchanger, a coolant-to-refrigerant heat exchanger and a refrigerant dryer in series fluid connection with one another. An engine coolant outlet connector is connected to the coolant-to-refrigerant exchanger. A compartment inlet connector connected to the coolant-to-refrigerant heat exchanger. A compartment outlet connector connected to the refrigerant-to-coolant heat exchanger. An engine coolant inlet connector connected to the refrigerant-to-coolant heat exchanger.

12 Claims, 12 Drawing Sheets

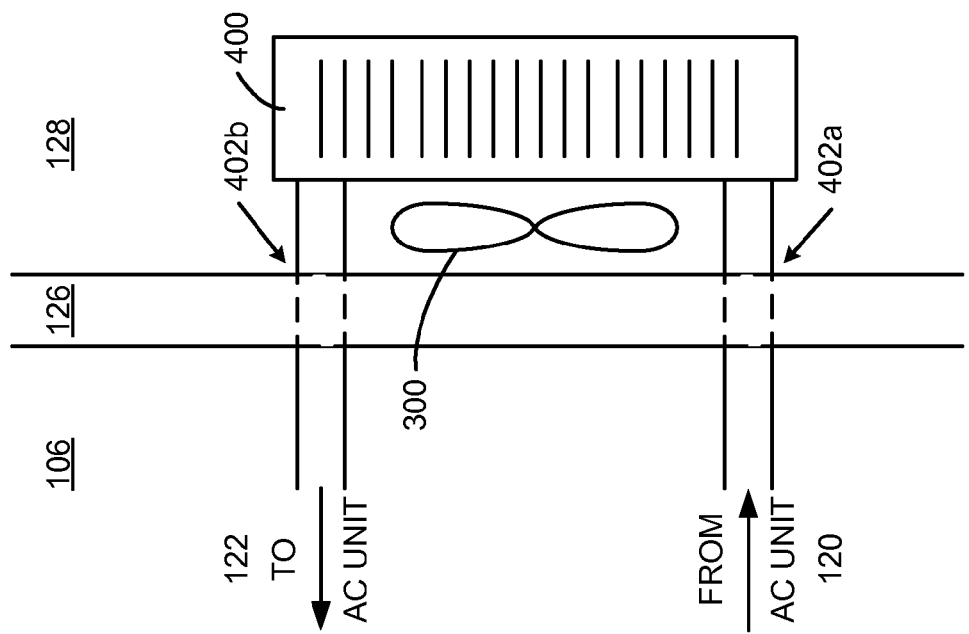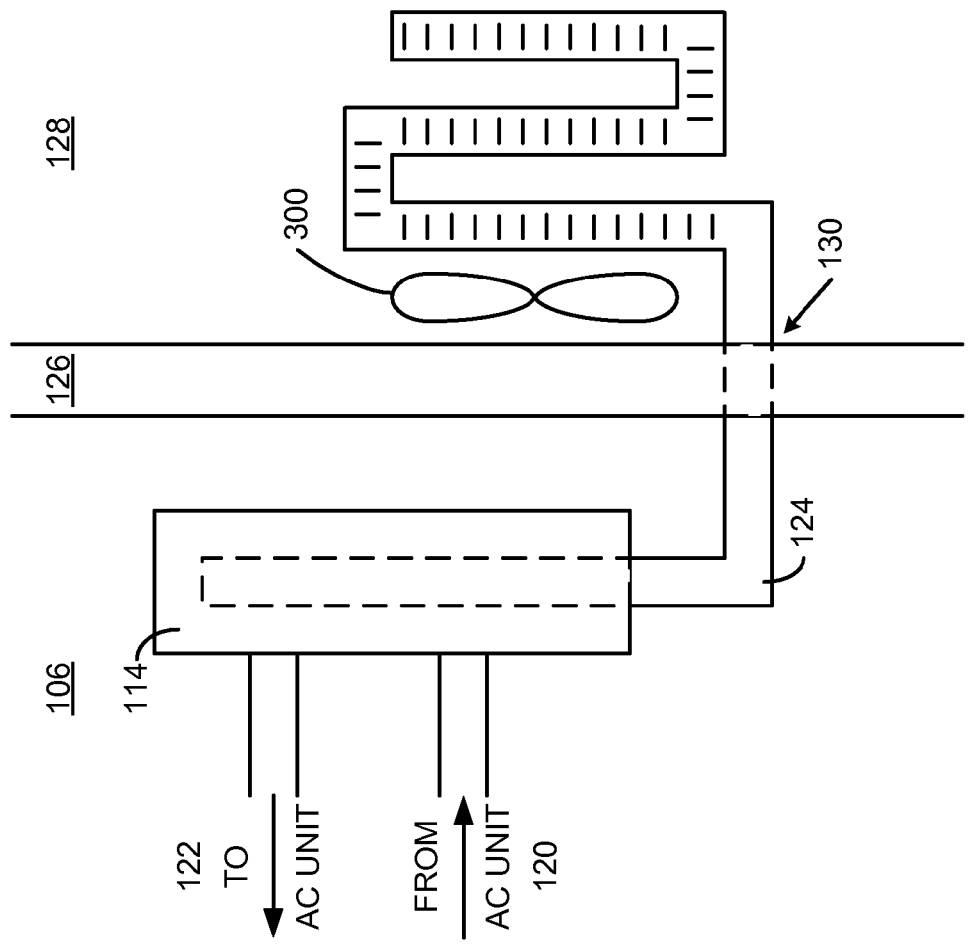

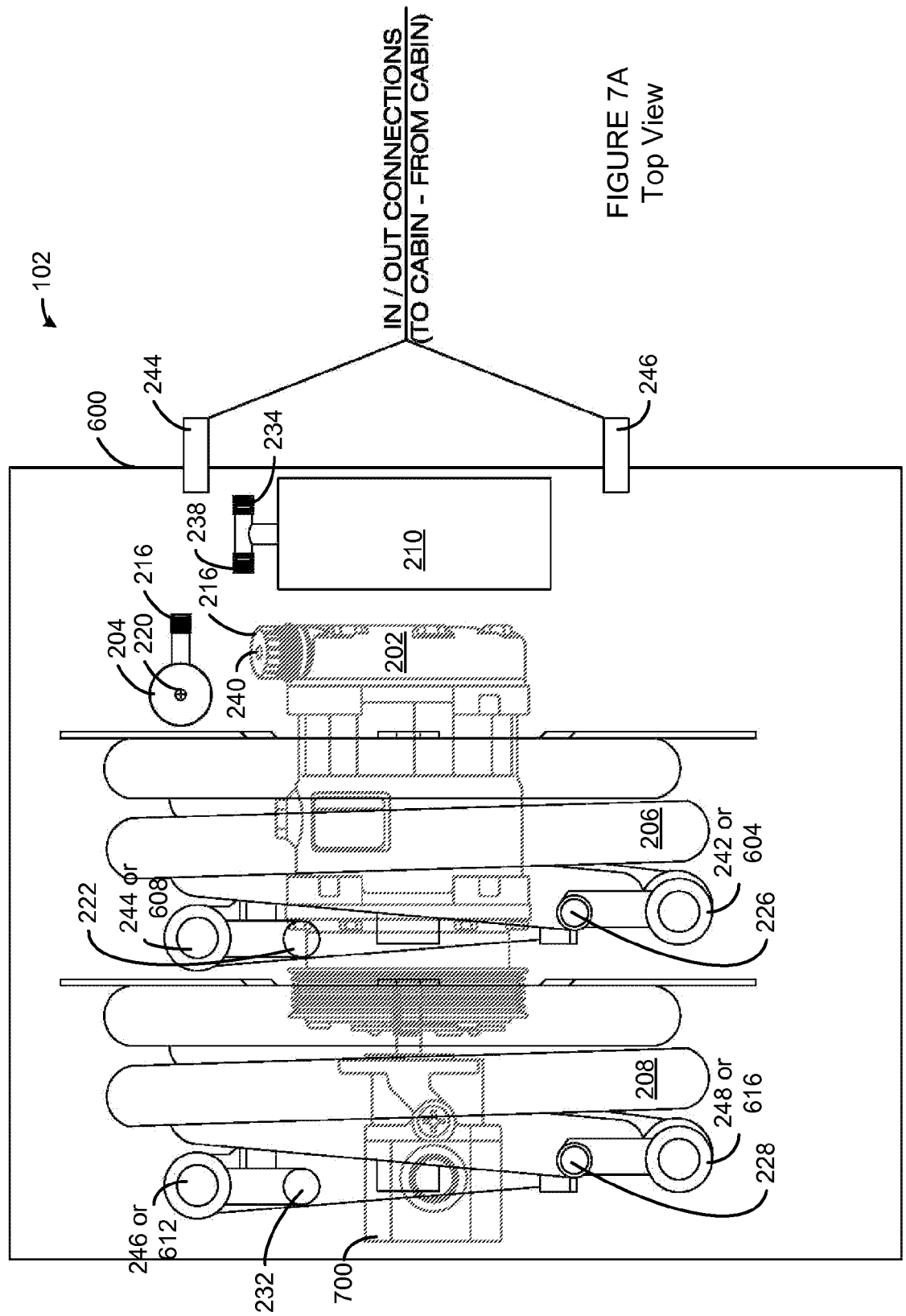

Side View

End View

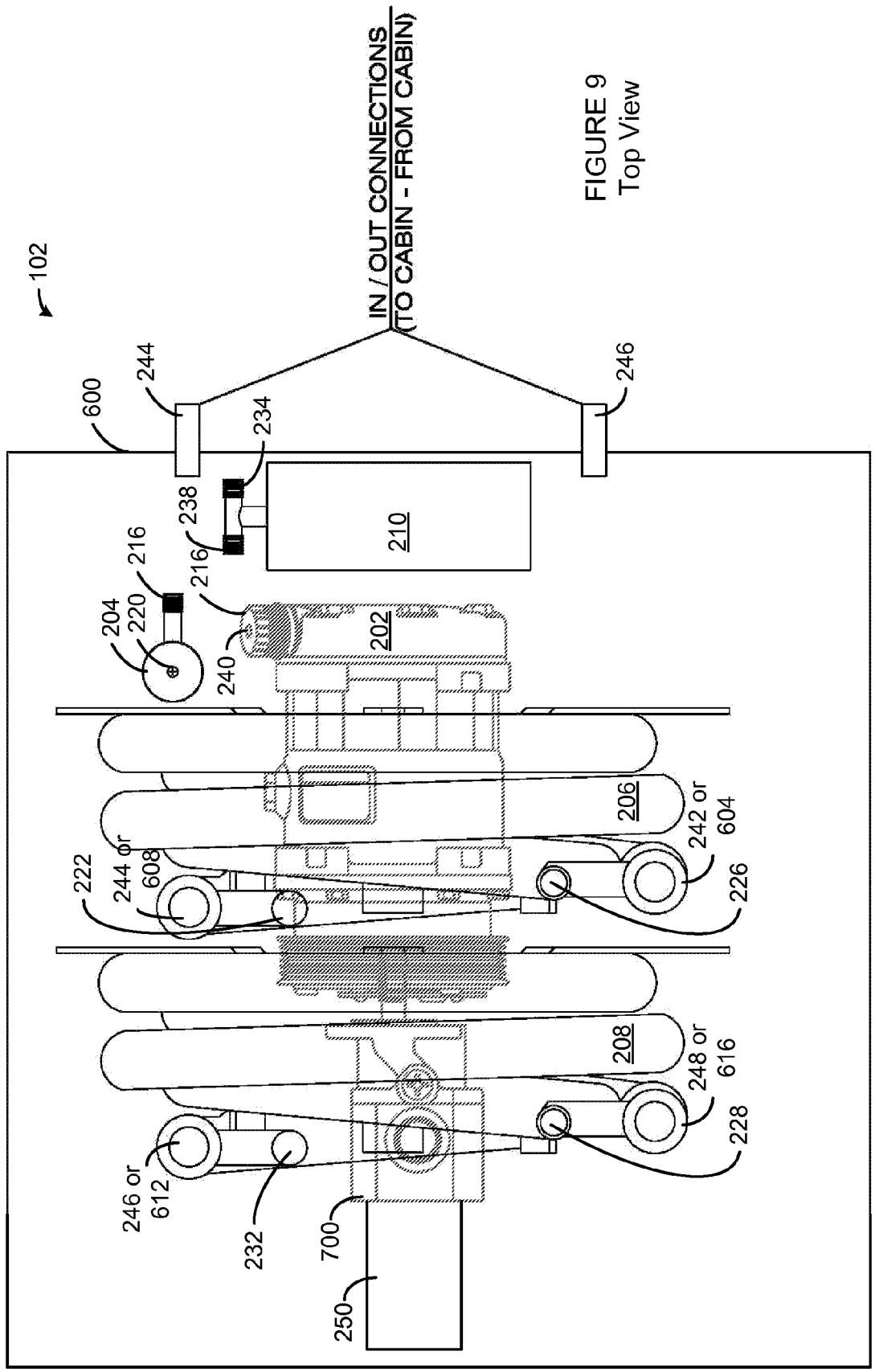

FIGURE 10

1002 — Pass an engine coolant through a coolant system that includes a thermostatically controlled proportional dividing valve connected to an engine cooling system, a refrigerant-to-cooling heat exchanger connected to the proportional dividing valve, a water chest connected to the refrigerant-to-cooling heat exchanger and mounted on a fire wall of the vehicle, a cooling-to-refrigerant heat exchanger connected to the water chest, and a check valve connected to cooling-to-refrigerant heat exchanger and the engine cooling system 1004 — Pass a refrigerant through a closed refrigeration loop that includes a compressor, a refrigerant dryer, the coolant-to-refrigerant heat exchanger and the refrigerant-to-coolant heat exchanger in series fluid connection with one another 1006 — Transfer heat from the crew compartment to a heat pipe using a fan, wherein the heat pipe is partially disposed within the water chest and extends through the fire wall into the crew compartment and transfers the heat to the engine coolant circulating through the water chest

1000

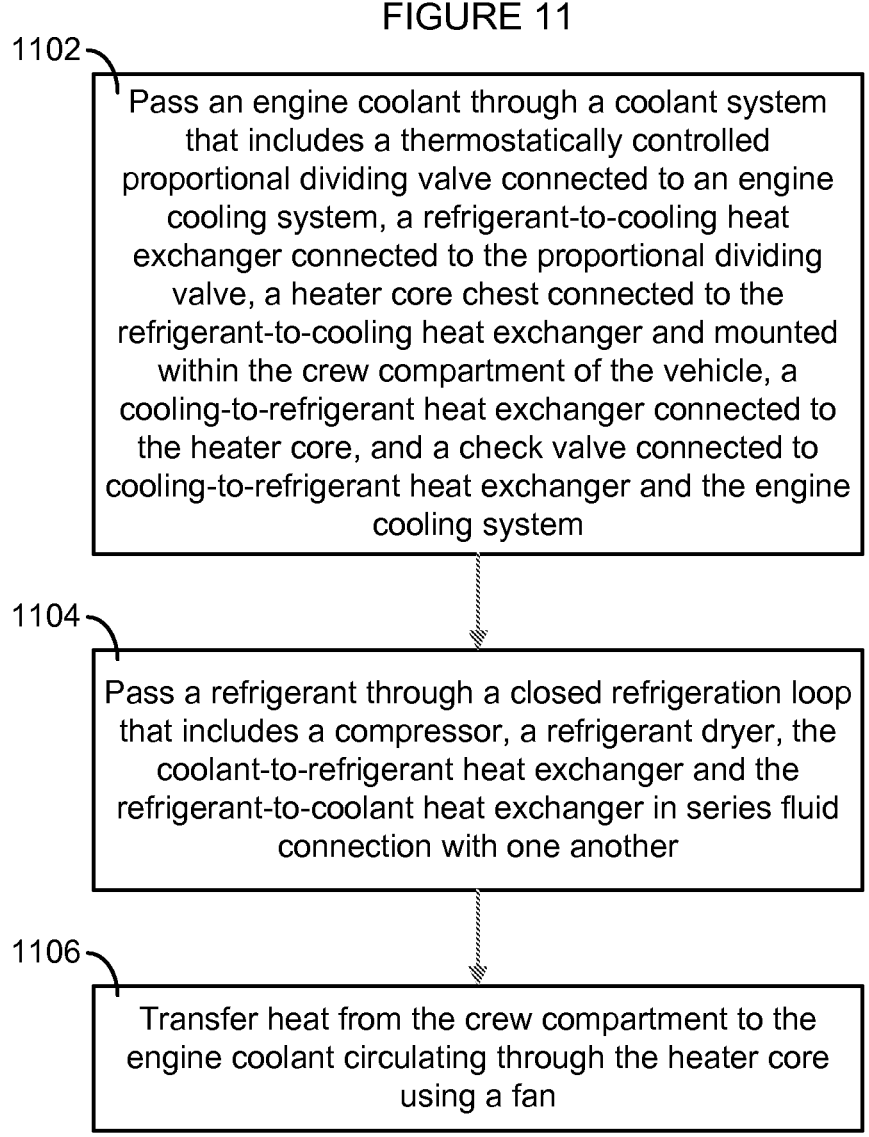

VEHICLE AIR CONDITIONER

FIELD OF THE INVENTION

The present invention relates generally to the field of vehicles and, more particularly, to an air conditioner for vehicles.

BACKGROUND OF THE INVENTION

The modern battlefield requires new and innovative tactical vehicle technologies to address challenges whose emergence has been seen with dramatic effect in both Iraq and Afghanistan. Among these, personnel protection and fuel economy ranks at the top of the list.

In many ways personnel protection and fuel economy go hand-in-hand. Increase the amount of armor on a vehicle to improve personnel protection and you increase the weight of the vehicle and you decrease its fuel economy. Increase a vehicles' fuel economy by reducing its engine's horsepower and you degrade its performance and decrease a soldier's ability to get out of harms way. While these are the most obvious components of the conundrum, several other issues emerge upon further inspection. For example, completely armoring a vehicle now means that its cabin's environment must be continuously heated or cooled to maintain comfort for its occupants. The heating and/or cooling, depending on the outside ambient temperature, reduce the vehicles fuel economy. This reduction in economy is a result of not only the horsepower required for its operation but also the weight that its components add to the vehicle.

Fully armored tactical vehicles not only enclose the crew compartment but also that of the engine. In typical applications the vehicles' air conditioning condenser is installed just ahead of the engines' charge air cooler which is mounted just ahead of the engines' radiator. This "stacking" of coolers results in the over sizing of components in order to compensate for the successive reduction in air flow and increase in effective ambient temperature. Additionally, after the air has flowed through these cooler assemblies it must now find its way out of the enclosed space, creating a positive back pressure within the engine compartment.

Optimizing vehicle systems such as cabin climate control cannot be done without a "Total Vehicle" approach. Air Conditioning and Heating Systems are generally not "add-ons" that are installed after a vehicle is designed. Integration from vehicle conception is the key to reaching the new goals dictated by today's battlefield environment.

The Modern Military Vehicles that are being designed must maximize available horsepower. With the installation of a conventional air conditioning system, air must be blown across the condenser to disperse heat contained in the R134A. Because of the design of the vehicle, the front grill has heavy armor with small vents to prevent as much damage as possible caused by explosions. Air is pulled into the engine compartment by a fan and then travels through the engine radiator to cool the water/glycol and then to the air conditioner condenser to cool the R134A refrigerant.

It is very important that the Modern Military Vehicle be such that it can be serviced and maintained as quickly as possible. If the vehicle becomes disabled and requires the replacement of an engine, every effort has been made to make this as easy as possible. Where a conventional air conditioning system is installed and a new engine is required, the entire air conditioning system must be removed. Once a new engine is installed the air conditioning system must be re-installed and re-charged with R134A. This process adds time and labor to the process.

A conventional air conditioning system requires refrigerant lines to run from the engine compartment to the crew cabin and back, requiring two penetrations in the hull of the vehicle. This creates three problems in the Modern Military Vehicle. One, the length of the refrigerant lines required making this loop, two, the amount of R134A required to keep the system charged, and three, two penetrations are required for the line to enter the hull and return to the engine compartment. The longer the refrigerant line, the higher the risk of leakage. When the system is down it takes costly time and labor to repair. If more R134A is required for the system, created in part by the length of the line, more refrigerant must be transported and inventoried to maintain adequate supply. Finally, each penetration that is bored into the hull of the vehicle increases the danger to the cabin crew by providing a path for foreign objects or materials to enter.

Another issue with a conventional air conditioning system is that the compressor speed is directly proportional to the speed of the engine. This means that the compressor must operate in either an "off" or "on" mode to control temperature thereby reducing the efficiency of the compressor.

Accordingly, there is a need for an air conditioning system that, among other things, is more efficient and easy to install or remove than conventional air conditioning systems.

SUMMARY OF THE INVENTION

The present invention provides an air conditioning system that, among other things, is more efficient and easy to install or remove than conventional air conditioning systems. The present invention utilizes existing vehicle subsystems such as the engine coolant and on-board electrical or hydraulic systems to maximize overall vehicle performance while improving maintainability. Although the present invention was conceived to be placed in Modern Military Vehicles, it is also adaptable for existing military vehicles as well as armored vehicles, commercial vehicles and motorized machines that do not have air conditioning systems installed or when it is deemed that the present invention provides higher value compared to an existing air conditioning system. In addition, the present invention may provide other benefits, including, but not limited to: light weight, requires less space, more efficient, increases overall vehicle performance, improves high ambient temperature performance, modular design allows installation in a variety of locations, Plug-N-Play, reduces amount of refrigerant required, fewer fittings limits potential for leakage, leakage gases are controlled within the module, and/or facilitates the removal and reinstallation of the engine module.

One embodiment of the present invention provides an air conditioner for a vehicle that includes a closed refrigeration loop. The closed refrigeration loop includes a compressor, a refrigerant-to-coolant heat exchanger, a coolant-to-refrigerant heat exchanger and a refrigerant dryer in series fluid connection with one another. An engine coolant outlet connector is connected to the coolant-to-refrigerant exchanger. A compartment inlet connector is connected to the coolant-to-refrigerant heat exchanger. A compartment outlet connector is connected to the refrigerant-to-coolant heat exchanger. An engine coolant inlet connector is connected to the refrigerant-to-coolant heat exchanger.

Another embodiment of the present invention provides a vehicle cooling system that includes a coolant system and a closed refrigeration loop. The coolant system includes a thermostatically controlled proportional dividing valve connected to an engine cooling system, a refrigerant-to-cooling heat exchanger connected to the thermostatically controlled proportional dividing valve, a water chest connected to the refrigerant-to-cooling heat exchanger and mounted on a fire wall of the vehicle, a cooling-to-refrigerant heat exchanger connected to the water chest, and a check valve connected to cooling-to-refrigerant heat exchanger and the engine cooling system. The closed refrigeration loop includes a compressor, a refrigerant-to-coolant heat exchanger, a coolant-to-refrigerant heat exchanger and a refrigerant dryer in series fluid connection with one another. A heat pipe is partially disposed within the water chest and extending through the fire wall into a crew compartment (also referred to as a cabin, cargo compartment, passenger compartment, etc.) to transfer heat from the crew compartment to the fluid circulating through the water chest.

Yet another embodiment of the present invention provides a modular air conditioner for a vehicle that includes a modular housing, a closed refrigeration loop disposed within the modular housing, and a hydraulic or electrical motor disposed within the modular housing. The closed refrigeration loop includes a compressor, a refrigerant-to-coolant heat exchanger, a coolant-to-refrigerant heat exchanger and a refrigerant dryer in series fluid connection with one another. An engine coolant outlet connector is attached to the exterior of the modular housing and connected to the coolant-to-refrigerant exchanger. A compartment inlet connector is attached to the exterior of the modular housing and connected to the coolant-to-refrigerant heat exchanger. A compartment outlet connector is attached to the exterior of the modular housing and connected to the refrigerant-to-coolant heat exchanger. An engine coolant inlet connector is attached to the exterior of the modular housing and connected to the refrigerant-to-coolant heat exchanger. The hydraulic or electric motor is connected to the compressor. A hydraulic or electrical connector is attached to the exterior of the modular housing and connected to the motor.

Another embodiment of the present invention provides a method for cooling a compartment of a vehicle (e.g., crew compartment, cabin, cargo compartment, passenger compartment, etc.). An engine coolant is passed through a coolant system that includes a thermostatically controlled proportional dividing valve connected to an engine cooling system, a refrigerant-to-cooling heat exchanger connected to the thermostatically controlled proportional dividing valve, a water chest connected to the refrigerant-to-cooling heat exchanger and mounted on a fire wall of the vehicle, a cooling-to-refrigerant heat exchanger connected to the water chest, and a check valve connected to the cooling-to-refrigerant heat exchanger and the engine cooling system. A refrigerant is passed through a closed refrigeration loop that includes a compressor, a refrigerant-to-coolant heat exchanger, a coolant-to-refrigerant heat exchanger and a refrigerant dryer in series fluid connection with one another. Heat is transferred from the crew compartment to a heat pipe using a fan. The heat pipe is partially disposed within the water chest and extends through the fire wall into the crew compartment and transfers the heat to the engine coolant circulating through the water chest.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 3 is a block diagram of a water chest and heat pipe in accordance with one embodiment of the present invention;

FIG. 5 is a block diagram of a heater core in accordance with another embodiment of the present invention;

FIGS. 7A, 7B and 7C are various views of an air conditioner in accordance with yet another embodiment of the present invention;

FIG. 9 is a top view of an air conditioner in accordance with another embodiment of the present invention;

FIG. 10 is a flow chart of a method for air conditioning a vehicle in accordance with another embodiment of the present invention and FIG. 11 is a flow chart of a method for air conditioning a vehicle in accordance with yet another embodiment of the present invention.

DETAILED DESCRIPTION OF THE INVENTION

Figure 1:
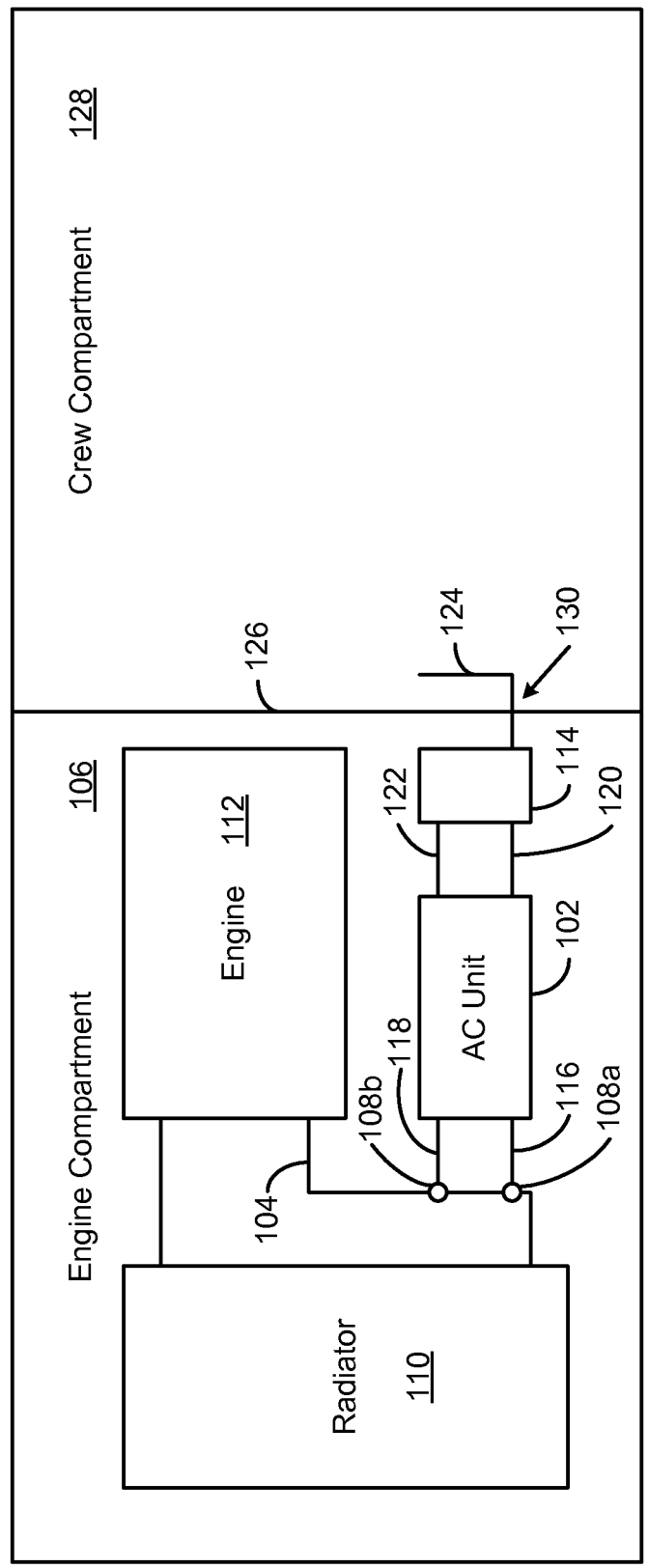
FIG. 1 is a block diagram of a vehicle having an air conditioner in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to a modular air conditioning system, such as the OmniTherm AC-200, but it will be understood that the concepts of the present invention are applicable to non-military vehicles, such as commercial vehicles.

The present invention provides an air conditioning system that, among other things, is more efficient and easy to install or remove than conventional air conditioning systems. The present invention utilizes existing vehicle subsystems such as the engine coolant and on-board electrical or hydraulic systems to maximize overall vehicle performance while improving maintainability. Although the present invention was conceived to be placed in Modern Military Vehicles, it is also adaptable for existing military vehicles as well as armored vehicles, commercial vehicles and motorized machines that do not have air conditioning systems installed or when it is deemed that the present invention provides higher value compared to an existing air conditioning system. In addition, the present invention may provide other benefits, including, but not limited to: light weight, requires less space, more efficient, increases overall vehicle performance, improves high ambient temperature performance, modular design allows installation in a variety of locations, Plug-N-Play, reduces amount of refrigerant required, fewer fittings limits potential for leakage, leakage gases are controlled within the module, and/or facilitates the removal and reinstallation of the engine module.

The present invention provides a light weight compact unit that is located anywhere on the vehicle. The present invention can be self-contained in a "plug and play" module or a nonmodular design so that it can be mounted in a more desirable part of the vehicle. The compressor can be driven hydraulically, mechanically, or electrically. When driven hydraulically or mechanically, the compressor speed can be infinitely controlled to improve its co-efficient of performance (COP). U.S. Department of Renewable Energy Studies show utilization of a variable speed compressor dramatically improves fuel economy when compared to a conventional belt driven unit. The present invention requires only one entry point through the vehicle's hull and into the crew compartment (also referred to as the cabin, passenger compartment, cargo compartment, etc.) to provide adequate climate control, thereby reducing the risk to the cabin crew in case of a blast event. The length of R134A refrigerant lines is reduced to inches versus feet in a conventional system. This reduces the risks of leaks and the amount of R134A required to charge the system. When the present invention is installed in a module, all pressurized refrigerant lines are contained within the module. Gas released due to a leak is contained in the module making the system environmentally friendly. The present invention requires less maintenance than a conventional system and in the modular design (plug and play) can easily be swapped out.

Now referring to FIG. 1, a block diagram of a vehicle 100 having an air conditioner 102 in accordance with one embodiment of the present invention is shown. The air conditioning unit 102 is connected to a coolant system 104 within the engine compartment 106 of the vehicle 100. Except for the connections 108a and 108b to the air conditioning unit 102, the coolant system 104 is a typical system using a radiator 110 to cool an engine 112. Connector 108a can be a typical T-connector or a thermostatically controlled proportional dividing valve. Connector 108b can be a typical T-connector or a check valve. Note that the thermostatically controlled proportional dividing valve and/or the check valve can be integrated into the air conditioning unit 102. Moreover, cutoff valves can be installed between connections 108a and 108b and the air conditioning unit 102 to allow installation and removal of the air conditioning unit 102 without draining existing coolant from the coolant system 104. Another connector (not shown) may also be included to purge air from the air conditioning unit 102 and water chest 114 after installation. The air conditioning unit 102 is connected to connector 108a with coolant line 116, and connected to connector 108b with coolant line 118.

The air conditioning unit 102 is also connected to a water chest 114 within the engine compartment 106 with coolant lines 120 and 122. A heat pipe 124 extends from the water chest 114 through the fire wall 126 into the crew compartment 128. One or more fans (not shown) typically blow air across the heat pipe 124 to cool the crew compartment 128. The present invention provides the advantage of only having one opening 130 through the firewall 126 instead of two or more. Moreover, the use of a heat pipe 124 eliminates the danger of gas or fumes leaking from the cooling system into the crew compartment 128. The vehicle 100 can be a military vehicle, an armored vehicle, a commercial vehicle or a motorized machine (e.g., crane, earth mover or other type of motorized machinery having a cooled crew compartment).

Figure 2:
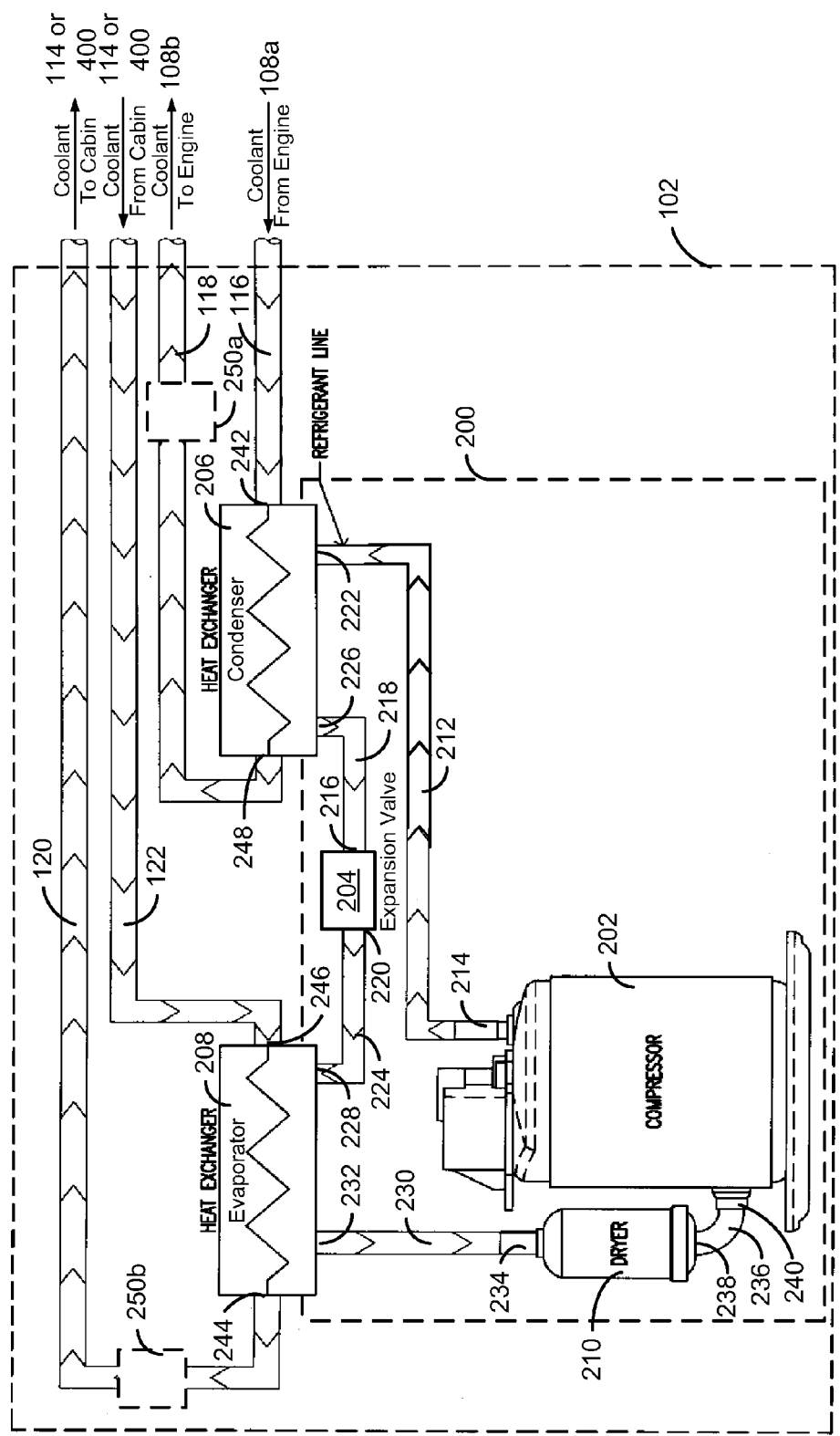
FIG. 2 is a flow diagram of an air conditioner in accordance with one embodiment of the present invention.

Referring now to FIG. 2, a flow diagram of an air conditioner 102 in accordance with one embodiment of the present invention is shown. The air conditioner 102 includes a closed refrigeration loop 200. The closed refrigeration loop 200 includes a compressor 202, an expansion valve 204, a coolant-to-refrigerant (condenser) heat exchanger 206, a refrigerant-to-coolant (evaporator) heat exchanger 208 and a refrigerant dryer 210 in series fluid connection with one another.

The compressor 202 can be a single speed compressor, a dual speed compressor or a variable speed compressor. The compressor 202 can also be powered hydraulically, mechanically or electrically. The coolant-to-refrigerant (condenser) heat exchanger 206 and the refrigerant-to-coolant (evaporator) heat exchanger 208 can be shell and tube type heat exchangers or other suitable type of heat exchanger. Refrigerant line 212 connects the output 214 of the compressor 202 to the input 222 of the coolant-to-refrigerant (condenser) heat exchanger 206. Refrigerant line 218 connects the output 226 of the coolant-to-refrigerant (condenser) heat exchanger 206 to the refrigerant input 216 of the expansion valve 204. Refrigerant line 224 connects the refrigerant output 220 of the expansion valve 204 to the refrigerant input 228 of the refrigerant-to-coolant (evaporator) heat exchanger 208. Refrigerant line 230 connects the refrigerant output 232 of the refrigerant-to-coolant (evaporator) 208 to the input of refrigerant dryer 210. Refrigerant line 236 connects the output 238 of the refrigerant dryer 210 to the input 240 of the compressor 202.

Figure 4:
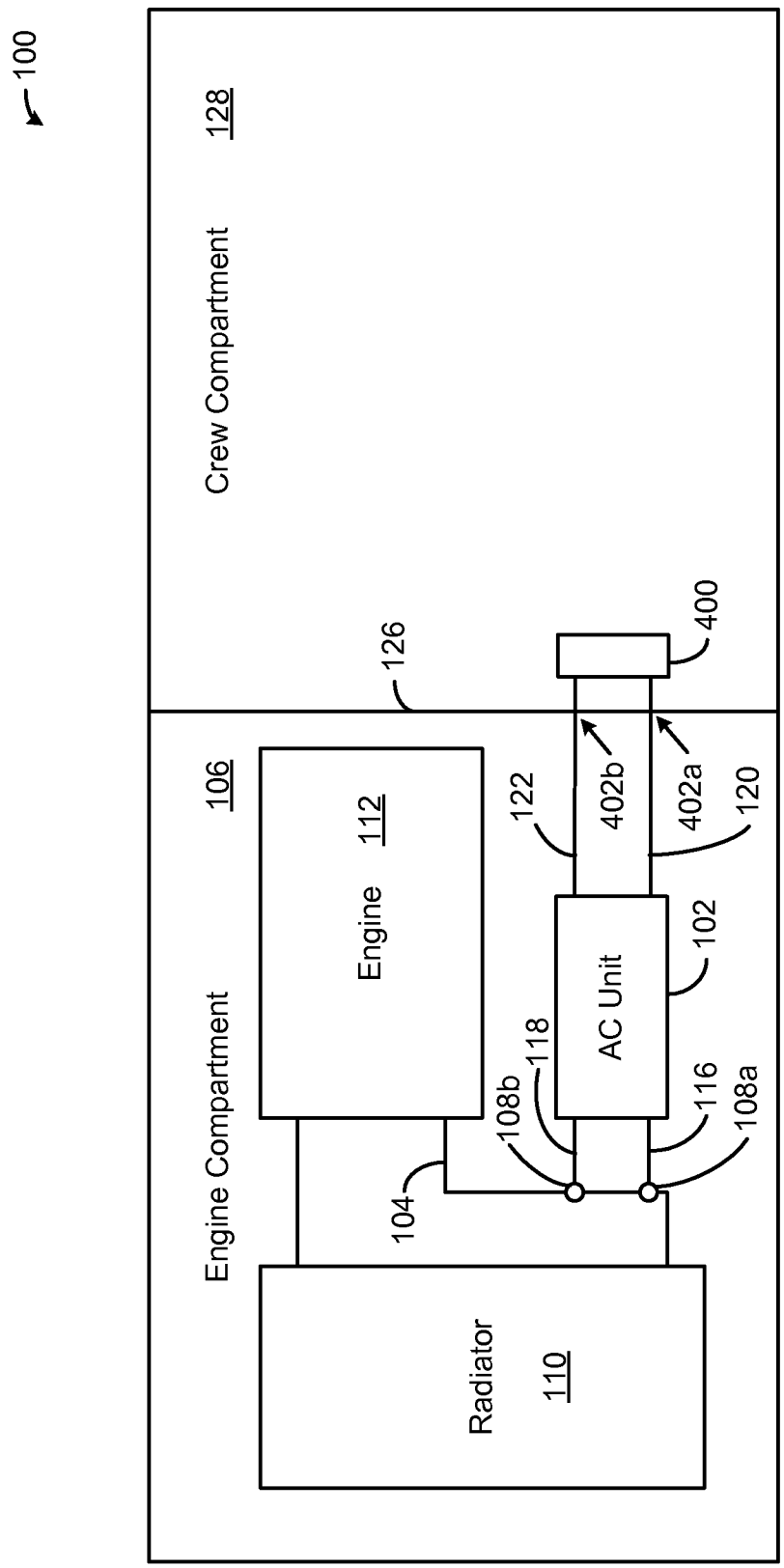
FIG. 4 is a block diagram of a vehicle having an air conditioner in accordance with another embodiment of the present invention.

Engine coolant inlet connector 242 connects the coolant-to-refrigerant (condenser) heat exchanger 206 to coolant line 116, which receives coolant from the engine coolant system 104 via connector 108a. Compartment outlet connector 244 connects the refrigerant-to-coolant (evaporator) heat exchanger 208 to coolant line 120, which sends coolant to the water chest 114 (FIGS. 1 and 3) or the heater core 400 (FIGS. 4 and 5). Compartment inlet connector 246 connects the refrigerant-to-coolant (evaporator) heat exchanger 208 to coolant line 122, which receives coolant from the water chest 114 (FIGS. 1 and 3) or the heater core 400 (FIGS. 4 and 5). Engine coolant outlet connector 248 connects the coolant-to-refrigerant (condenser) exchanger 206 to coolant line 118, which sends coolant to the engine coolant system 104 via connector 108b.

In another embodiment, the air conditioner 102 may also include pumps 250a and 250b (shown with dashed lines to show that they are optional) in fluid connection with refrigerant-to-coolant heat exchanger 206 and coolant-to-refrigerant heat exchanger 208, respectively, to ensure proper coolant flow through the system. Alternatively, pumps 250a and 250b can be external to the air conditioner 102.

Now referring to FIG. 3, a block diagram of a water chest 114 and heat pipe 124 in accordance with one embodiment of the present invention are shown. The water chest 114 is in fluid communication with the air conditioner 102. The water chest 114 sends coolant to the air conditioner 102 via coolant line 122, which is connected to the compartment inlet connector 246 of the air conditioner 102. The heat pipe 124 (also called thermosyphon 124) is partially disposed within the water chest 114 and extends through the fire wall 126 into the crew compartment 128 of the vehicle 100. A fan 300 is disposed in close proximity with the heat pipe 124 to force air across the heat pipe and transfer energy to the air within the crew compartment 128 to provide the desired temperature. As previously described, the heat pipe 124 only requires one opening 130 in the fire wall 126. Moreover, a heater core can be used instead of or in combination with the heat pipe 124 (see FIG. 5).

Briefly referring to FIGS. 1-3, the operation of the air conditioner 102 in accordance with one embodiment of the present invention will be described. A portion of the engine water/glycol coolant flowing from the outlet of the vehicle's radiator 110 is routed through another radiator integral to the vehicle radiator 110 for additional cooling. Doing so drops the temperature of this coolant flow from normal engine operating temperature to approximately 140° F. This super-cooled coolant flow is routed to the air conditioning unit 102 through a thermostatically controlled proportional dividing valve. Upon entering the module 102, the coolant flows through the refrigerant-to-coolant heat exchanger 206 where its temperature is dropped to a low as 40° F. The cold coolant is then sent to a water chest 114 mounted on the fire wall 126 of the vehicle 100. A heat pipe (thermosyphon) 124 is mounted inside the water chest 114. The purpose of this heat pipe 124 is to transfer heat inside of the vehicle cabin 128 to the coolant circulating through the water chest 114. Coolant is then sent back to the module 102 where it flows through the coolant-to-refrigerant heat exchanger 208 where it absorbs heat from the refrigerant. After exiting the module 102 the coolant is then reintroduced into the engines' main coolant flow through a check valve where it flows into the engine water jacket.

Referring now to FIG. 4, a block diagram of a vehicle 100 having an air conditioner 102 in accordance with another embodiment of the present invention is shown. The air conditioning unit 102 is connected to a coolant system 104 within the engine compartment 106 of the vehicle 100. Except for the connections 108a and 108b to the air conditioning unit 102, the coolant system 104 is a typical system using a radiator 110 to cool an engine 112. Connector 108a can be a typical T-connector or a thermostatically controlled proportional dividing valve. Connector 108b can be a typical T-connector or a check valve. Note that the thermostatically controlled proportional dividing valve and/or the check valve can be integrated into the air conditioning unit 102. Moreover, cutoff valves can be installed between connections 108a and 108b and the air conditioning unit 102 to allow installation and removal of the air conditioning unit 102 without draining existing coolant from the coolant system 104. Another connector (not shown) may also be included to purge air from the air conditioning unit 102 and heater core 400 after installation. The air conditioning unit 102 is connected to connector 108a with coolant line 116, and connected to connector 108b with coolant line 118.

The air conditioning unit 102 is also connected to a heater core 400 within the crew compartment 106 with coolant lines 120 and 122. Coolant lines 120 and 122 extend through the fire wall 126 into the crew compartment 128. One or more fans (not shown) typically blow air across the heater core 400 to cool the crew compartment 128. In this embodiment there are two openings 402a and 402b through the firewall 126. This embodiment is designed to be used as a retrofit unit on a vehicle 100 that has an existing heater core 400. The vehicle 100 can be a military vehicle, an armored vehicle, a commercial vehicle or a motorized machine (e.g., crane, earth mover or other type of motorized machinery having a cooled crew compartment). Note that the present invention can be adapted to function with both a water chest 114 and a heater core 400, or multiple heater cores or any combination thereof.

Now referring to FIG. 5, a block diagram of a heater core 400 in accordance with another embodiment of the present invention is shown. The heater core 400 is in fluid connection with the air conditioner 102. The heater core 400 receives coolant from the air conditioner 102 via coolant line 120, which is connected to the compartment outlet connector 244 of the air conditioner 102. The heater core 400 sends coolant to the air conditioner 102 via coolant line 122, which is connected to the compartment inlet connector 246 of the air conditioner 102. A fan 300 is disposed in close proximity with the heater core 400 to force air across the heat pipe and transfer energy to the air within the crew compartment 128 to provide the desired temperature. The heater core 400 requires two openings 402a and 402b in the fire wall 126. The heater core 400 can be an existing unit in the vehicle 100 or a new unit.

Figure 6:
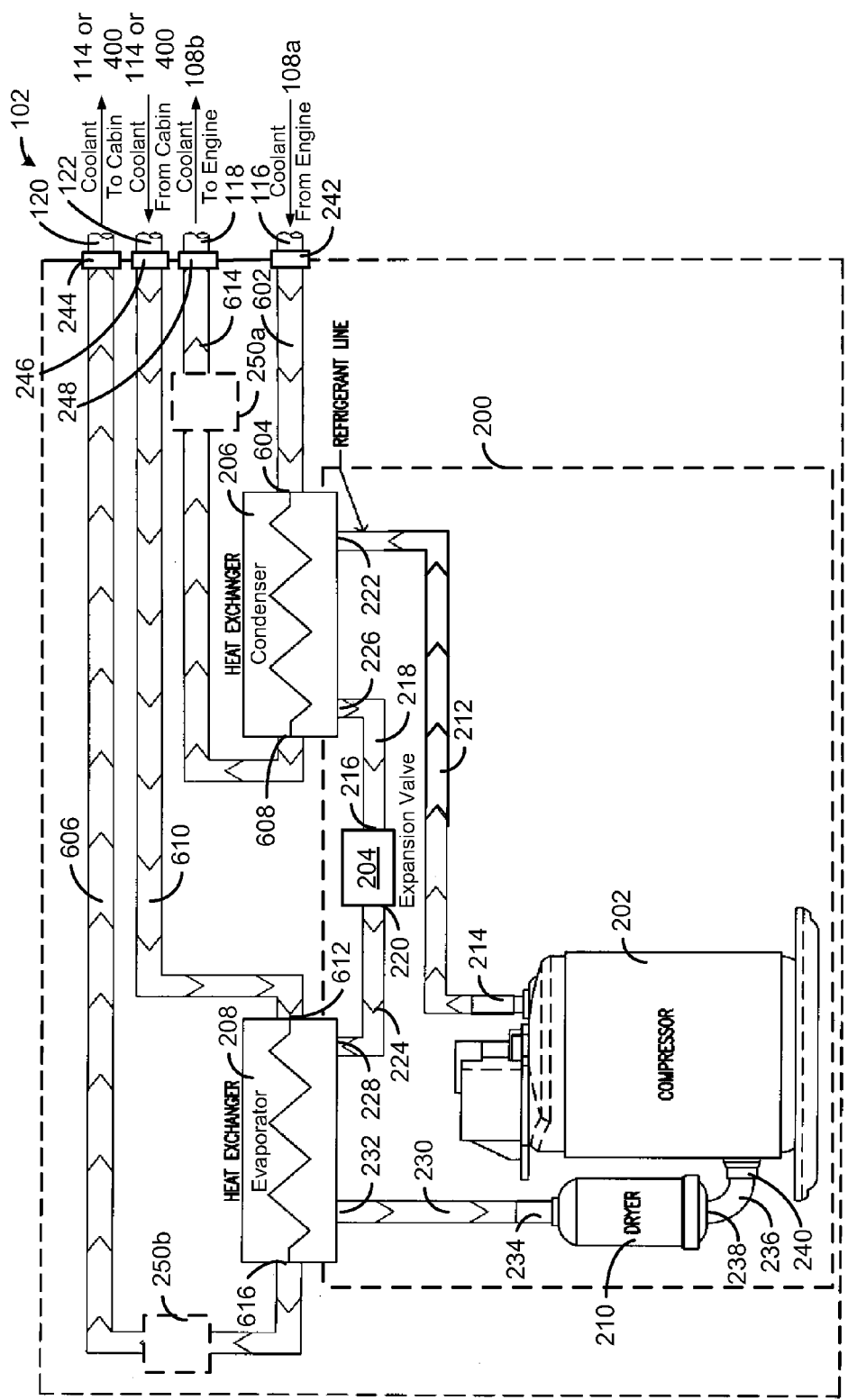
FIG. 6 is a flow diagram of an air conditioner in accordance with yet another embodiment of the present invention.

Referring now to FIG. 6, a flow diagram of a modular air conditioner 102 in accordance with yet another embodiment of the present invention is shown. The air conditioner 102 includes a closed refrigeration loop 200. The closed refrigeration loop 200 includes a compressor 202, an expansion valve 204, a coolant-to-refrigerant (condenser) heat exchanger 206, a refrigerant-to-coolant (evaporator) heat exchanger 208 and a refrigerant dryer 210 in series fluid connection with one another. The compressor 202 can be a single speed compressor, a dual speed compressor or a variable speed compressor. The compressor 202 can also be powered hydraulically, mechanically or electrically. The coolant-to-refrigerant (condenser) heat exchanger 206 and the refrigerant-to-coolant (evaporator) heat exchanger 208 can be shell and tube type heat exchangers or other suitable type of heat exchanger. Refrigerant line 212 connects the output 214 of the compressor 202 to the input 222 of the coolant-to-refrigerant (condenser) heat exchanger 206. Refrigerant line 218 connects the output 226 of the coolant-to-refrigerant (condenser) heat exchanger 206 to the refrigerant input 216 of the expansion valve 204. Refrigerant line 224 connects the refrigerant output 220 of the expansion valve 204 to the refrigerant input 228 of the refrigerant-to-coolant (evaporators heat exchanger 208. Refrigerant line 230 connects the refrigerant output 232 of the refrigerant-to-coolant (evaporator) 208 to the input of refrigerant dryer 210. Refrigerant line 236 connects the output 238 of the refrigerant dryer 210 to the input 240 of the compressor 202.

The air conditioner 102 in this embodiment is modular such that the closed refrigeration loop 200 is disposed within a housing 600. The engine coolant outlet connector 248, the compartment inlet connector 246, the compartment outlet connector 244 and the engine coolant inlet connector 242 are attached to an exterior of the housing 600. The modular housing 600 can be a waterproof aluminum tube or other suitable material and shape. The housing 600 and closed refrigeration loop 200 allow the air conditioner 102 to be easily installed or removed from a vehicle without having to deal with any refrigerant, such as R134A, which reduces cost and improve efficiency. Various other connections (not shown) will also be necessary to power the compressor 202. For example, a hydraulic or electrical connector can be attached to the exterior of the modular housing 600 to power a hydraulic or electrical motor disposed within the housing 600. Similarly, a sealed driveshaft attached to the exterior and extending inward through the housing 600 can be used to drive the compressor 202 from an exterior motor or a belt drive.

Within the housing 600, coolant line 602 connects the engine coolant inlet connector 242 to the coolant input 604 of the coolant-to-refrigerant (condenser) heat exchanger 206. Coolant line 606 connects the compartment outlet connector 244 to the coolant output 616 of the refrigerant-to-coolant (evaporator) heat exchanger 208. Coolant line 610 connects the compartment inlet connector 246 to the coolant input 612 of the refrigerant-to-coolant (evaporator) heat exchanger 208. Coolant line 614 connects the engine coolant outlet connector 248 to the coolant output 608 of the coolant-to-refrigerant (condenser) heat exchanger 206.

Outside the housing 600, engine coolant inlet connector 242 connects the air conditioner 102 to coolant line 116, which receives coolant from the engine coolant system 104 via connector 108a. Compartment outlet connector 244 connects the air conditioner 102 to coolant line 120, which sends coolant to the water chest 114 (FIGS. 1 and 3) or the heater core 400 (FIGS. 4 and 5). Compartment inlet connector 246 connects the air conditioner 102 to coolant line 122, which receives coolant from the water chest 114 (FIGS. 1 and 3) or the heater core 400 (FIGS. 4 and 5). Engine coolant outlet connector 248 connects the air conditioner 102 to coolant line 118, which sends coolant to the engine coolant system 104 via connector 108b.

In another embodiment, the air conditioner 102 may also include pumps 250a and 250b (shown with dashed lines to show that they are optional) in fluid connection with coolant-to-refrigerant heat exchanger 206 and a refrigerant-to-coolant heat exchanger 208 to ensure proper coolant flow through the system. Alternatively, pumps 250a and 250b can be external to the air conditioner 102.

Figure 7B:
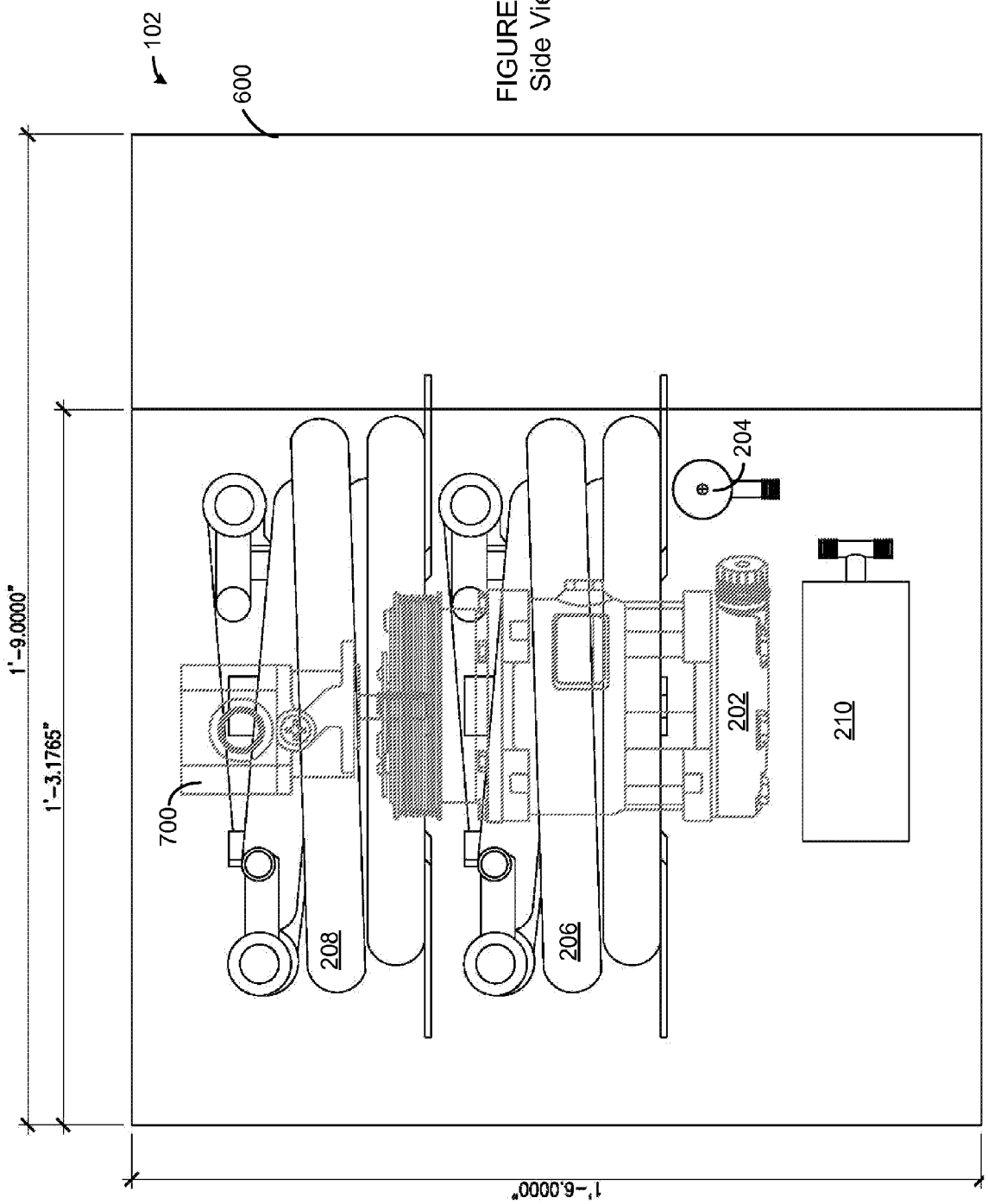
Figure 7C:
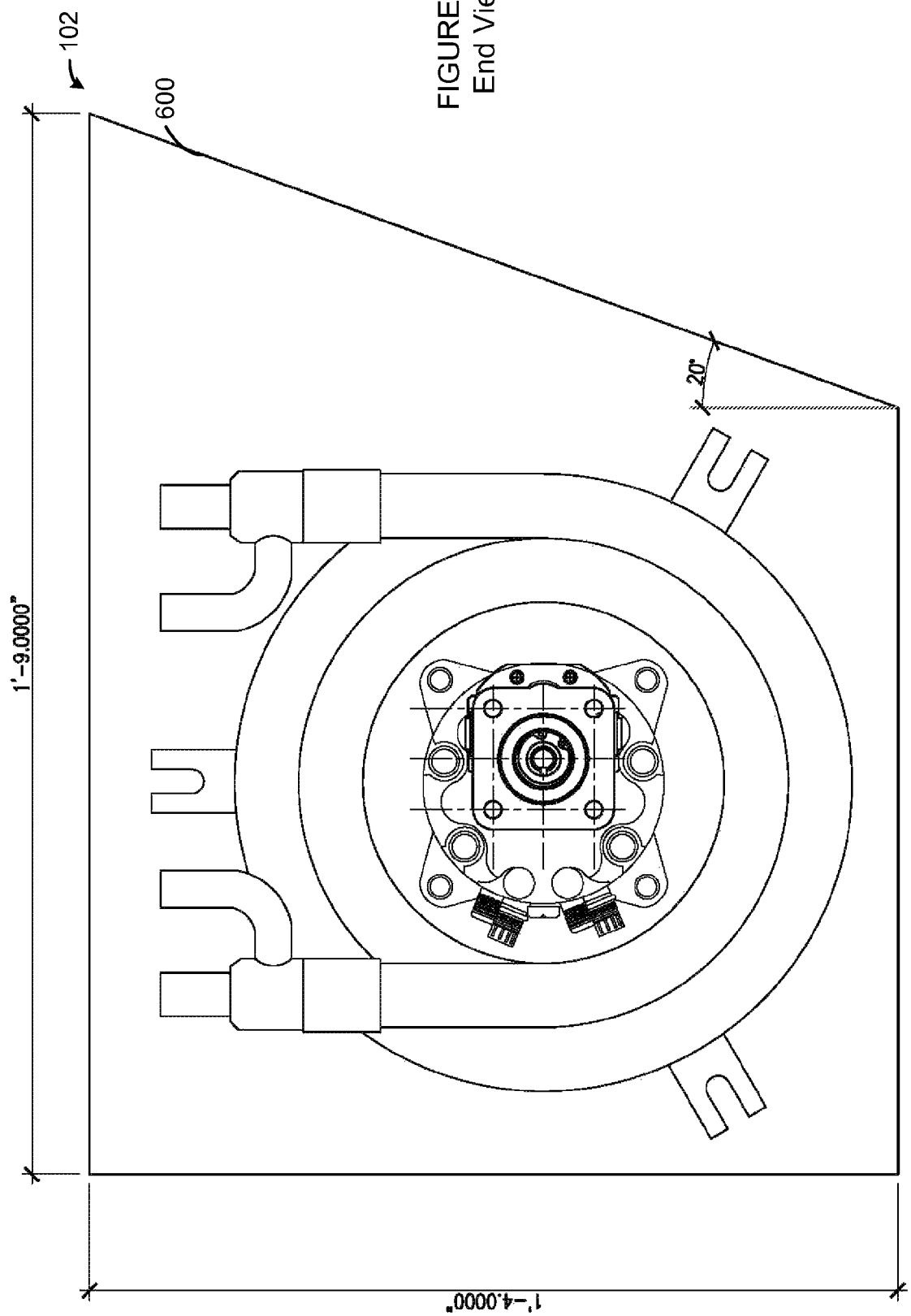

Now referring to FIGS. 7A (top view), 7B (side view) and 7C (end view), various views of an air conditioner 102 in accordance with yet another embodiment of the present invention is shown. As previously described, the air conditioner 102 includes a compressor 202, an expansion valve 204, a refrigerant-to-coolant heat exchanger 206, a coolant-to-refrigerant heat exchanger 208 and a refrigerant dryer 210 in series fluid connection with one another. The compressor 202 is driven by motor 700. All the components are self contained within the housing 600, which includes compartment inlet connector 246 and compartment outlet connector 244. Note that the reference numerals for the coolant inputs and outputs to the heat exchangers will vary depending on the configuration of the air conditioner 102 (FIG. 2 or 6).

Figure 8:
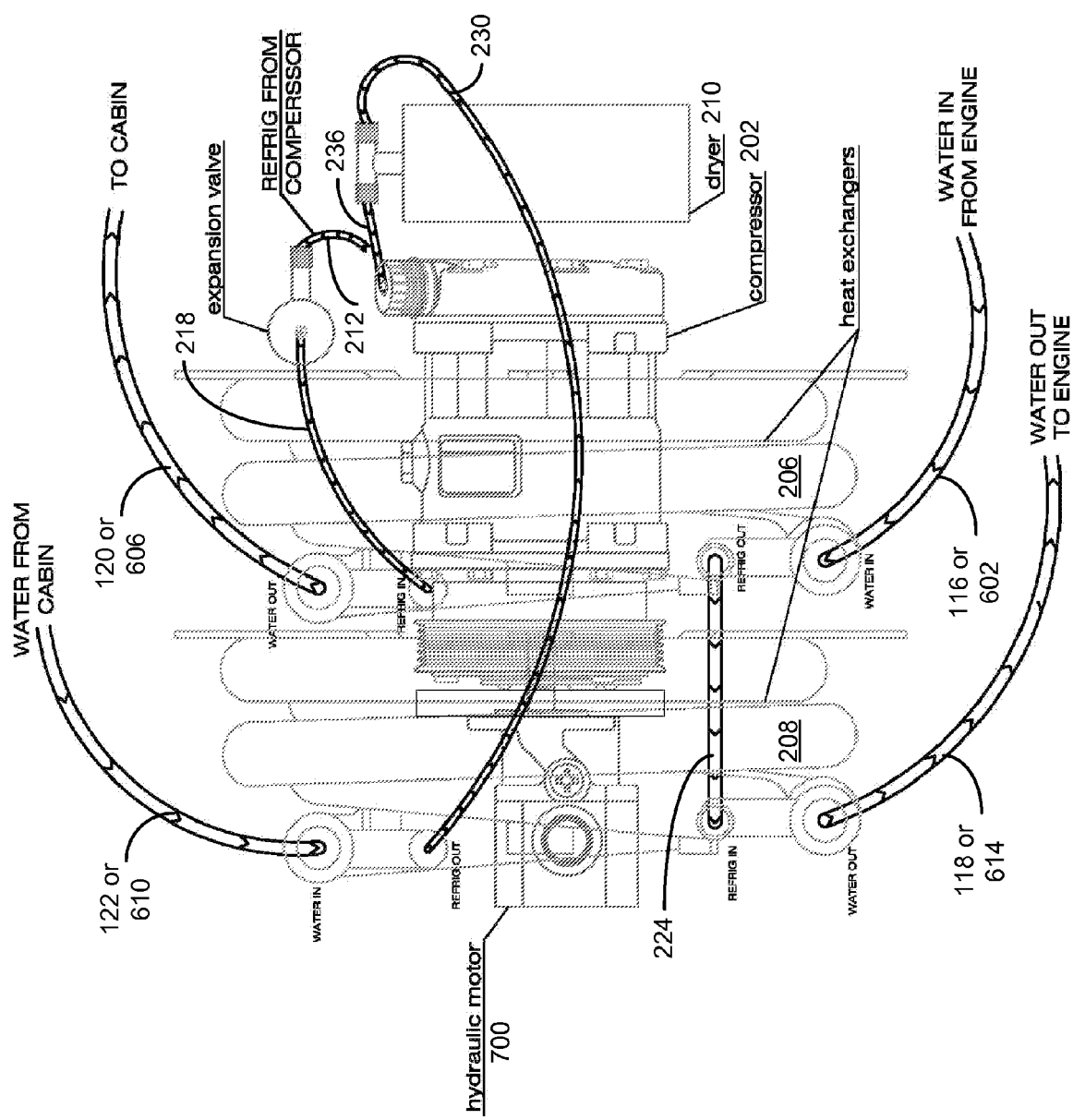
FIG. 8 is a top view of the air conditioner shown in FIG. 7A illustrating the fluid connections.

Referring now to FIG. 8, a top view of the air conditioner 102 is shown in FIG. 7A illustrating the fluid connections is shown. The closed refrigeration loop is formed by connecting the coolant-to-refrigerant heat exchanger 208 to refrigerant dryer 210 with refrigerant line 230, refrigerant dryer 210 to compressor 202 with refrigerant line 236, compressor 202 to expansion valve 204 with refrigerant line 212, expansion valve 204 to refrigerant-to-coolant heat exchanger 206 with refrigerant line 218, and refrigerant-to-coolant heat exchanger 206 to coolant-to-refrigerant heat exchanger 208 with refrigerant line 224. Note that the reference numerals for the coolant inputs and outputs to the heat exchangers will vary depending on the configuration of the air conditioner 102 (FIG. 2 or 6).

Now referring to FIG. 9, a top view of an air conditioner 102 in accordance with another embodiment of the present invention is shown. As previously described, the air conditioner 102 includes a compressor 202, an expansion valve 204, a refrigerant-to-coolant heat exchanger 206, a coolant-to-refrigerant heat exchanger 208 and a refrigerant dryer 210 in series fluid connection with one another. The compressor 202 is driven by motor 700. Motor 700 also drives both pumps 250. All the components are self contained within the housing 600, which includes compartment inlet connector 246 and compartment outlet connector 244. Note that the reference numerals for the coolant inputs and outputs to the heat exchangers will vary depending on the configuration of the air conditioner 102 (FIG. 2 or 6).

Referring now to FIG. 10, a flow chart of a method 1000 for air conditioning a vehicle in accordance with another embodiment of the present invention is shown. An engine coolant is passed through a coolant system in block 1002. The coolant system includes a thermostatically controlled proportional dividing valve connected to an engine cooling system, a refrigerant-to-cooling heat exchanger connected to the thermostatically controlled proportional dividing valve, a water chest connected to the refrigerant-to-cooling heat exchanger and mounted on a fire wall of the vehicle, a cooling-to-refrigerant heat exchanger connected to the water chest, and a check valve connected to cooling-to-refrigerant heat exchanger and the engine cooling system. A refrigerant is passed through a closed refrigeration loop in block 1004. The closed refrigeration loop includes a compressor, a refrigerant dryer, the coolant-to-refrigerant heat exchanger and the refrigerant-to-coolant heat exchanger in series fluid connection with one another. Heat from is transferred from the crew compartment to a heat pipe using a fan in block 1006. The heat pipe is partially disposed within the water chest and extends through the fire wall into the crew compartment and transfers the heat to the engine coolant circulating through the water chest.

Now referring to FIG. 11, a flow chart of a method 1100 for air conditioning a vehicle in accordance with yet another embodiment of the present invention is shown. An engine coolant is passed through a coolant system in block 1102. The coolant system includes a thermostatically controlled proportional dividing valve connected to an engine cooling system, a refrigerant-to-cooling heat exchanger connected to the thermostatically controlled proportional dividing valve, a heater core disposed within the crew compartment is connected to the refrigerant-to-cooling heat exchanger, a cooling-to-refrigerant heat exchanger connected to the heater core, and a check valve connected to cooling-to-refrigerant heat exchanger and the engine cooling system. A refrigerant is passed through a closed refrigeration loop in block 1104. The closed refrigeration loop includes a compressor, a refrigerant dryer, the coolant-to-refrigerant heat exchanger and the refrigerant-to-coolant heat exchanger in series fluid connection with one another. Heat is transferred from the crew compartment to the engine coolant circulating through the heater core using a fan in block 1106.

Although preferred embodiments of the present invention have been described in detail, it will be understood by those skilled in the art that various modifications can be made therein without departing from the spirit and scope of the invention as set forth in the appended claims.

What is claimed is:

1. A vehicle cooling system for a vehicle having (a) an engine compartment containing having an engine and an engine coolant system that cools the engine with an engine coolant, (b) a crew compartment and (c) a fire wall disposed between the engine compartment and the crew compartment, wherein the vehicle cooling system comprises:
a cooling system disposed within the engine compartment, the cooling system comprising a thermostatically controlled proportional dividing valve connected to an engine cooling system to receive the engine coolant from the engine coolant system, a coolant-to-refrigerant heat exchanger connected to the thermostatically controlled proportional dividing valve, a water chest connected to a refrigerant-to-cooling heat exchanger and mounted on the fire wall of the vehicle, the refrigerant-to-cooling heat exchanger connected to the water chest, and a check valve connected to the cooling-to-refrigerant heat exchanger and the engine cooling system to return the engine coolant to the engine coolant system;
a modular housing mounted within the engine compartment;
a closed refrigeration loop disposed within the modular housing, the closed refrigeration loop comprising a compressor, the refrigerant-to-coolant heat exchanger, an expansion valve, the coolant-to-refrigerant heat exchanger and a refrigerant dryer in series fluid connection with one another, wherein: (a) the closed refrigeration loop is not in fluid connection with the engine coolant system, (b) the closed refrigeration loop is in thermal connection with engine coolant system via the coolant-to-refrigerant heat exchanger, and (c) the closed refrigeration loop is in thermal connection with the water chest via the refrigerant-to-coolant heat exchanger; and
a heat pipe partially disposed within the water chest and extending through the fire wall into the crew compartment to transfer heat from the crew compartment to the fluid circulating through the water chest.

2. The air conditioner as recited in claim 1, wherein the vehicle comprises a military vehicle, an armored vehicle, a commercial vehicle or a motorized machine.

3. The vehicle cooling system as recited in claim 1, wherein the compressor is a single speed compressor, a dual speed compressor or a variable speed compressor.

4. The vehicle cooling system as recited in claim 1, wherein the compressor is powered hydraulically, mechanically or electrically.

5. The vehicle cooling system as recited in claim 1, further comprising an electrical motor or a hydraulic motor connected to the compressor.

6. The vehicle cooling system as recited in claim 5, further comprising:
a first pump in fluid connection between the check valve and the coolant-to-refrigerant heat exchanger; and
a second pump in fluid connection between the water chest and the refrigerant-to-coolant heat exchanger.

7. The vehicle cooling system as recited in claim 6, wherein the first pump and the second pump are driven by the electrical motor or the hydraulic motor.

8. The vehicle cooling system as recited in claim 1, wherein the coolant-to-refrigerant heat exchanger and the refrigerant-to-coolant heat exchanger each comprise a shell and tube type heat exchanger.

9. The vehicle cooling system as recited in claim 1, wherein the modular housing comprises a waterproof aluminum housing.

10. The vehicle cooling system as recited in claim 1, wherein the heat pipe extends through the fire wall into the crew compartment and only requires one opening in the fire wall.

11. The vehicle cooling system as recited in claim 1, wherein the water chest is replaced with a heater core in fluid connection with the refrigerant-to-coolant heat exchanger, and disposed within a crew compartment.

12. A method for cooling a crew compartment of a vehicle having (a) an engine compartment containing having an engine and an engine coolant system that cools the engine with an engine coolant, (b) a crew compartment and (c) a fire wall disposed between the engine compartment and the crew compartment, the method comprising the steps of:
passing a portion of the engine coolant through a coolant system disposed within the engine compartment, the coolant system comprising a thermostatically controlled proportional dividing valve connected to the engine cooling system to receive the engine coolant from the engine coolant system, a coolant-to-refrigerant heat exchanger connected to the thermostatically controlled proportional dividing valve, a water chest connected to a refrigerant-to-coolant heat exchanger and mounted on the fire wall of the vehicle, the refrigerant-to-coolant heat exchanger connected to the water chest, and a check valve connected to the coolant-to-refrigerant heat exchanger and the engine cooling system to return the engine coolant to the engine coolant system;
passing a refrigerant through a closed refrigeration loop disposed within a housing mounted within the engine compartment, the closed refrigeration loop comprising a compressor, the coolant-to-refrigerant heat exchanger, an expansion valve, the refrigerant-to-coolant heat exchanger and a refrigerant dryer in series fluid connection with one another, wherein: (a) the closed refrigeration loop is not in fluid connection with the engine coolant system, (b) the closed refrigeration loop is in thermal connection with engine coolant system via the coolant-to-refrigerant heat exchanger, and (c) the closed refrigeration loop is in thermal connection with the water chest via the refrigerant-to-coolant heat exchanger; and
transferring heat from the crew compartment to a heat pipe using a fan, wherein the heat pipe is partially disposed within the water chest and extends through the fire wall into the crew compartment and transfers the heat to the engine coolant circulating through the water chest.

* * * * *